(12) United States Patent
Gasser

(10) Patent No.: US 8,905,753 B2
(45) Date of Patent: Dec. 9, 2014

(54) DEVICE FOR RESTRICTING HOT, DUST-LADEN GAS FLOWS

(75) Inventor: Urs Gasser, Rüfenach (CH)

(73) Assignee: Holcim Technology Ltd., Jona (CH)

( * ) Notice: Subject to any disclaimer, the term of this patent is extended or adjusted under 35 U.S.C. 154(b) by 1023 days.

(21) Appl. No.: 12/733,316

(22) PCT Filed: Aug. 21, 2008

(86) PCT No.: PCT/IB2008/002172
§ 371 (c)(1),
(2), (4) Date: Feb. 23, 2010

(87) PCT Pub. No.: WO2009/027787
PCT Pub. Date: Mar. 5, 2009

(65) Prior Publication Data
US 2010/0199893 A1    Aug. 12, 2010

(30) Foreign Application Priority Data
Aug. 27, 2007   (AT) ................ A 1339/2007

(51) Int. Cl.
*F27B 15/12* (2006.01)
*C04B 7/47* (2006.01)
*F27B 7/20* (2006.01)
*F27D 99/00* (2010.01)

(52) U.S. Cl.
CPC ............. *C04B 7/47* (2013.01); *F27B 7/2033* (2013.01); *F27D 99/007* (2013.01); *F27B 7/20* (2013.01)
USPC .............................................. 432/16; 432/72

(58) Field of Classification Search
CPC ........ F27B 7/2025; F27B 7/20; F27B 7/2016; C22B 1/2413; B01J 8/0055; B01J 8/1836; B01J 6/001; B01J 6/002; C01D 7/123; C21D 9/00
USPC .......................................... 432/16, 67, 72, 176
See application file for complete search history.

(56) References Cited

U.S. PATENT DOCUMENTS

| | | | |
|---|---|---|---|
| 1,678,342 A | | 7/1928 | Kling et al. |
| 1,995,845 A | * | 3/1935 | Flintermann ............. 126/285 A |
| 4,050,882 A | * | 9/1977 | Kohl et al. ..................... 432/14 |
| 4,182,359 A | * | 1/1980 | Rickard .................. 137/246.22 |
| 4,492,570 A | | 1/1985 | Suzuki et al. |
| 5,246,041 A | * | 9/1993 | Wiese ............................... 141/1 |
| 6,468,075 B2 | * | 10/2002 | Streit et al. .................... 432/106 |
| 2002/0022207 A1 | | 2/2002 | Streit et al. |
| 2009/0098498 A1 | * | 4/2009 | Klegraf et al. ................ 432/106 |
| 2010/0050906 A1 | * | 3/2010 | Schurmann et al. .......... 106/771 |

FOREIGN PATENT DOCUMENTS

| | | |
|---|---|---|
| DE | 856 190 | 11/1952 |
| DE | 33 30 607 A1 | 3/1984 |
| DE | 10 2006 023 980 A1 | 11/2007 |

* cited by examiner

Primary Examiner — Gregory A Wilson
(74) Attorney, Agent, or Firm — Taft Stettinius & Hollister LLP

(57) ABSTRACT

In a device for restricting hot, dust-laden gas flows and, in particular, dust-laden hot cooling air from clinker coolers (4) in a tertiary air duct (5) of a clinker kiln, the restrictor (6) is formed by segments (8) which are displaceable transversely to the direction of flow in a duct (5) and which are connectable with one another.

9 Claims, 1 Drawing Sheet

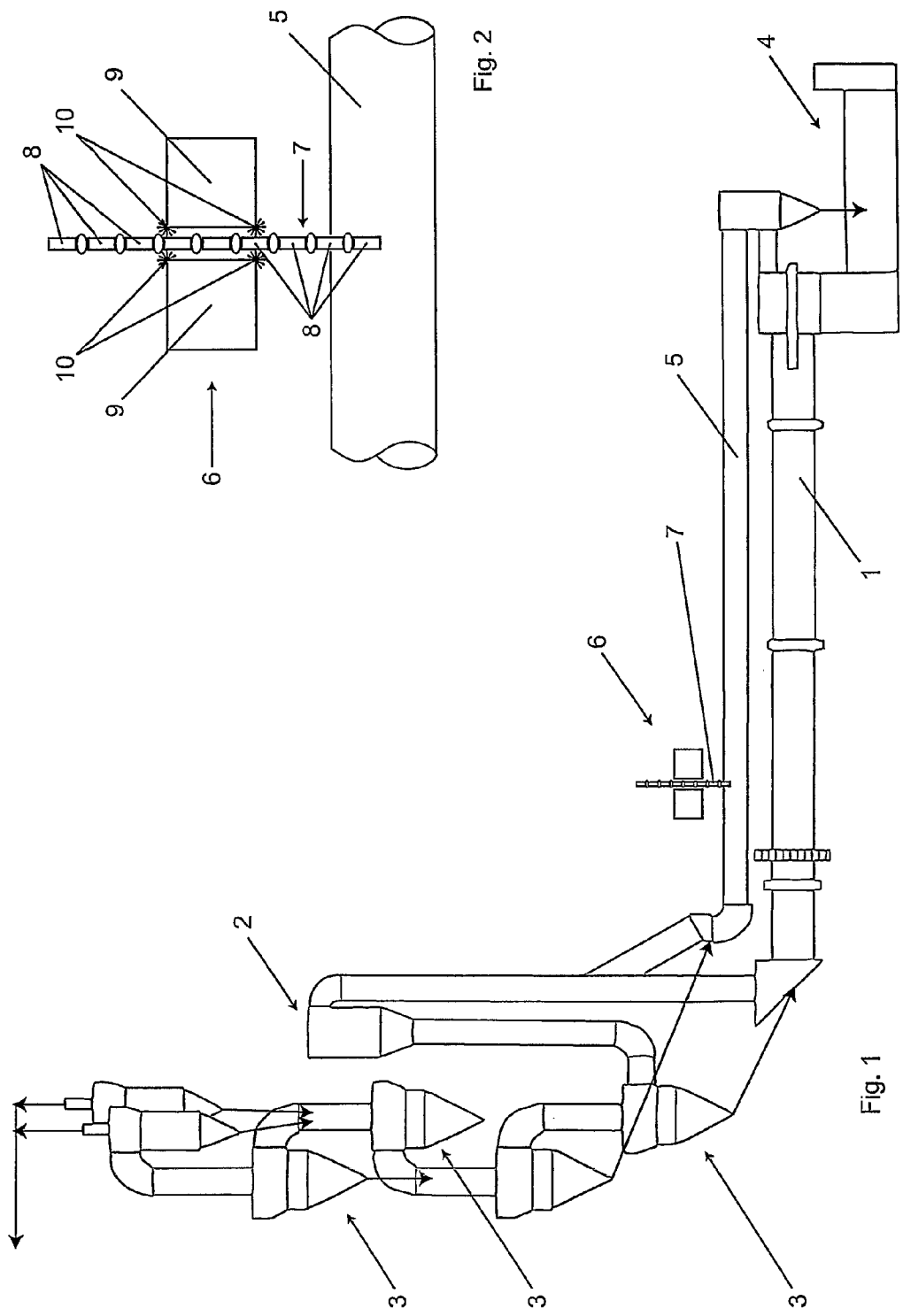

DEVICE FOR RESTRICTING HOT, DUST-LADEN GAS FLOWS

The invention relates to a device for restricting hot, dust-laden gas flows and, in particular, dust-laden hot cooling air from clinker coolers in a tertiary air duct of a clinker kiln.

BACKGROUND OF THE INVENTION

In the production of clinker, the energy expenditure involved in the precalcination or calcination of the charge constitutes an essential cost factor. As a rule, precalciners require more than 60 percent of the overall heat input in such plants, wherein the clinker enters a clinker cooler after having left the rotary tubular kiln or clinker kiln. Such clinker coolers use ambient air, i.e. comparatively cold air, for cooling, with considerable amounts of cooling air being consequently heated. Precalciners require relatively high amounts of combustion air, wherein the use of preheated air is especially favorable in terms of energetics. To this end, clinker furnaces which are preceded by precalciners usually comprise what is called a tertiary air duct to feed the exhaust air from the hot zone of the clinker cooler back to the precalciner as combustion air.

In order to achieve optimum operating characteristics in such a plant, the amount of air respectively fed to the calciner must, however, be adjusted, via tertiary air ducts, as a function of the amount of fuel used, wherein exhaust air having a temperature of between 650 and 1100° C. and a high portion of clinker dust can, as a rule, be drawn off the clinker cooler. The gas regulators or throttle valves usually provided there are subject to extremely high wear due to the high temperatures and the high dust load, so that plants of this type have to be repeatedly shut down for maintenance purposes in order to service or exchange the throttle valves.

DE 102006023980 A1, for instance, describes a throttle valve which is formed of an element that is rotationally or pivotally mounted in a calciner nozzle to adjust the cross section of the calciner nozzle.

US 2002022207 A1 describes a pivotable throttle valve which is arranged in an exhaust gas duct of a rotary tubular kiln and capable of being pivoted into the exhaust gas duct from a laterally attached fulcrum, wherein the exhaust gas flow flows laminarly in any pivoted position.

BRIEF SUMMARY OF THE INVENTION

The invention now aims to provide a device for restricting hot, dust-laden gas flows of the initially defined kind, which can be operated over extended periods of time without interruption of operation and in which maintenance and repair work can be done without interruption of operation. To solve this object, the configuration according to the invention of the restriction device essentially consists in that the restrictor is formed by segments which are displaceable transversely to the direction of flow in a duct and which are connectable with one another and with a displacement drive. Due to the fact that the restrictor is formed by segments which are displaceable transversely to the direction of flow in a duct, the individual segments can be inserted into the duct and, in particular, into the tertiary air duct, whereby new segments can be simply reconstructed and inserted from outside whenever such segments have become unusable on their edges, which are particularly prone to wear. To this end, the segments are interconnectable and, accordingly, even detachably connected with one another so as to enable the respective disengagement of the drive and the insertion of new segments. Especially simple maintenance and safe operation will be ensured in that the segments are articulately connected with one another, to which end a displacement drive of the segments is preferably detachable from the segments for the installation of further segments and reconnectable with the or the further segment (s).

The gas regulator valve according to the invention can advantageously be inserted in a manner that means for retaining the segments in their respective positions are provided. This enables the drive to be decoupled or detached and reconnected with the gas regulator valve end that has been extended by the attachment of segments.

The individual segments of the guillotine-like closing member in a particularly advantageous manner can be formed of ceramic elements and/or steel segments. In order to ensure safe operation and precise restriction, the configuration is advantageously devised such that the segments are supported or guided in or on guides extending transversely to the direction of flow.

As pointed out in the beginning, the device according to the invention can be used in a particularly advantageous manner in clinker plants, in which case the configuration is advantageously devised such that the restrictor is arranged in a tertiary air duct of a clinker kiln near the air inlet of a precalciner.

In a particularly advantageous manner, the arrangement is effected such that the segments are arranged to suspend from the duct and displaceable in a substantially vertical direction so as to prevent any undesired, flow-related material accumulation in the direction of flow after the restriction device.

BRIEF DESCRIPTION OF THE SEVERAL VIEWS OF THE DRAWINGS

In the following, the invention will be explained in more detail by way of an exemplary embodiment schematically illustrated in the drawing.

Therein, FIG. 1 is a schematic view of a clinker production plant; and

FIG. 2 shows an enlarged detail of the adjustable restrictor.

DETAILED DESCRIPTION OF THE INVENTION

In FIG. 1, a rotary tubular kiln used for the production of clinker is denoted by 1. The charging material is calcined in a precalciner 2, wherein preheating in a multi-stage arrangement of floating-gas heat exchangers 3 is additionally performed. The rotary tubular kiln 1 or clinker kiln 1 precedes a clinker cooler 4, which is cooled with air, wherein the accordingly heated exhaust air is fed back to the precalciner 2 via a tertiary air duct 5. Within said tertiary air duct 5 is arranged an adjustable restrictor or throttle 6 whose throttle member, which is designed in the manner of a slide 7, is formed by a plurality of segments. The restrictor 6 is illustrated on an enlarged scale in FIG. 2.

From FIG. 2, the individual segments 8 of the slide valve, which is actuated in a guillotine-like manner, are apparent, wherein a drive 9 is further provided to cooperate with the slide 7 via a suitable force-locking engagement 10. When the lowermost segment has eroded in the course of the wear caused by the dust-laden, hot air prevailing in the tertiary duct 5, an appropriate further segment 8 can be attached to the other end of the slide outside the tertiary air duct. During this operation, the slide 7 is fixed in its instantaneous position in order to enable its separation from the drive 9. After completion of this operation, the drive 9 is readjusted in such a manner as to be reconnectable with the then extended slide 7 without changing its position. It is thus feasible, without complicated removal and without interruption of the operation of the kiln, to add a supplement to the slide by the extent by which the wear has made the respective segments reaching into the tertiary air duct 5 unusable.

The force-locking engagement indicated at 10 can be realized by a fixing means for the respective positions of the segments, wherein the drive can be detached during the fixation of the segments in their positions and newly connected with the end that has been extended by the attachment of segments. A simple drive and a simple construction of the segments may thus be chosen.

The invention claimed is:

1. A device for restricting hot, dust-laden gas flows in an air duct, comprising
    a restrictor member and
    a displacement drive for the restrictor member, wherein
    said restrictor member is designed as a slide formed of segments,
    said slide is displaceable in a substantially vertical direction transversely to a direction of flow in the duct,
    said segments are articulately connected with one another and are connectable with the displacement drive,
    said displacement drive is detachable from the segments for installation of further segments and is reconnectable with the further segments,
    said displacement drive cooperates with the slide via a force-locking engagement comprising fixing means for retaining the segments in their respective positions upon detachment of the displacement drive from the segments, said fixing means being arranged on the displacement drive outside of and above the air duct, and wherein the segments are arranged to suspend from the duct.

2. A device according to claim 1, wherein the segments are formed of one or more of ceramic elements and steel segments.

3. A device according to claim 2, wherein the restrictor member is arranged in a tertiary air duct of a clinker kiln near an air inlet of a precalciner or near air extractors at an air cooler.

4. A device according to claim 1, wherein the segments are supported or guided in or on guides extending transversely to the direction of flow in the duct.

5. A device according to claim 4, wherein the segments are formed of one or more of ceramic elements and steel segments.

6. A device according to claim 5, wherein the restrictor member is arranged in a tertiary air duct of a clinker kiln near an air inlet of a precalciner or near air extractors at an air cooler.

7. A device according to claim 1, wherein the restrictor member is arranged in a tertiary air duct of a clinker kiln near an air inlet of a precalciner or near air extractors at an air cooler.

8. A device according to claim 7, wherein the segments are supported or guided in or on guides extending transversely to the direction of flow in the duct.

9. A device for restricting hot, dust-laden gas flows in an air duct, comprising
    a restrictor member designed as a slide, and
    a displacement drive for the restrictor member, wherein
    said restrictor member is formed of segments displaceable in a substantially vertical direction transversely to a direction of flow in the duct,
    said segments are articulately connected with one another and are connectable with the displacement drive,
    said segments are formed of one or more of ceramic elements and steel segments,
    said segments are supported or guided in or on guides extending transversely to the direction of flow in the duct,
    the segments are arranged to suspend from the duct,
    said displacement drive is detachable from the segments for installation of further segments and is reconnectable with the further segments,
    said displacement drive cooperates with the slide via a force-locking engagement comprising fixing means for retaining the segments in their respective positions upon detachment of the displacement drive from the segments, said fixing means being arranged on the displacement drive outside of and above the air duct,
    the segments are arranged to suspend from the duct, and
    the restrictor member is arranged in a tertiary air duct of a clinker kiln near an air inlet of a precalciner or near air extractors at an air cooler.

* * * * *